United States Patent
Filliman et al.

(10) Patent No.: US 7,064,794 B2
(45) Date of Patent: Jun. 20, 2006

(54) METHOD FOR DYNAMIC CONTRAST IMPROVEMENT

(75) Inventors: Paul Dean Filliman, Indianapolis, IN (US); Thomas Edward Horlander, Indianapolis, IN (US)

(73) Assignee: Thomson Licensing, Boulogne (FR)

( * ) Notice: Subject to any disclaimer, the term of this patent is extended or adjusted under 35 U.S.C. 154(b) by 53 days.

(21) Appl. No.: 10/494,135

(22) PCT Filed: Oct. 28, 2002

(86) PCT No.: PCT/US02/34414

§ 371 (c)(1),
(2), (4) Date: Apr. 30, 2004

(87) PCT Pub. No.: WO03/039137

PCT Pub. Date: May 8, 2003

(65) Prior Publication Data

US 2004/0207760 A1    Oct. 21, 2004

Related U.S. Application Data

(60) Provisional application No. 60/337,634, filed on Nov. 1, 2001.

(51) Int. Cl.
*H04N 5/52* (2006.01)
(52) U.S. Cl. ..................................... 348/678
(58) Field of Classification Search ............... 348/678, 348/682, 683, 684, 686, 254–256; H04N 5/52
See application file for complete search history.

(56) References Cited

U.S. PATENT DOCUMENTS

| | | | |
|---|---|---|---|
| 4,628,362 A | * | 12/1986 | Waehner ...................... 348/572 |
| 4,654,710 A | | 3/1987 | Richard ...................... 358/169 |
| 4,829,381 A | | 5/1989 | Song et al. .................. 358/168 |
| 4,862,270 A | | 8/1989 | Nishio ......................... 358/160 |
| 5,099,330 A | | 3/1992 | Fuse et al. ................... 358/169 |
| 5,162,902 A | | 11/1992 | Bell et al. .................... 358/168 |
| 5,191,420 A | | 3/1993 | Lagoni et al. .............. 358/168 |
| 5,422,680 A | | 6/1995 | Lagoni et al. .............. 348/674 |
| 5,517,333 A | | 5/1996 | Tamura et al. .............. 358/158 |
| 5,550,556 A | | 8/1996 | Wu et al. |
| 5,777,590 A | | 7/1998 | Saxena et al. ................ 345/89 |
| 5,963,665 A | | 10/1999 | Kim et al. ................... 382/169 |
| 6,075,574 A | | 6/2000 | Callway ...................... 348/673 |
| 6,111,980 A | | 8/2000 | Sano et al. .................. 382/167 |
| 6,285,413 B1 | | 9/2001 | Akbayir ....................... 348/678 |

FOREIGN PATENT DOCUMENTS

EP    0 963 112 A1    12/1999

* cited by examiner

Primary Examiner—Michael H. Lee
(74) Attorney, Agent, or Firm—Joseph S. Tripoli; Robert D. Shedd; William A. Lagoni

(57) ABSTRACT

A method for dynamic contrast improvement of video data includes the steps of analyzing a portion of a video frame, and forcing a start of DCI transfer function computations in response to an end of the analysis of the portion of the video frame.

11 Claims, 6 Drawing Sheets

METHOD FOR DYNAMIC CONTRAST IMPROVEMENT

This application claims the benefit, under 35 U.S.C. § 365 of International Application PCT/US02/34414, filed Oct. 28, 2002, which was published in accordance with PCT Article 21(2) on May 8, 2003 in English and which claims the benefit of U.S. provisional patent application No. 60/337,634, filed Nov. 1, 2001.

FIELD OF THE INVENTION

The present invention relates to dynamic contrast improvement ("DCI") of video data.

BACKGROUND OF THE INVENTION

There is a strong demand on picture contrast in video displays, but each display has a limited dynamic range. In general, the picture contrast cannot be increased by simply increasing the video signal amplitude because exceeding the display dynamic range causes unwanted effects. Additionally, newer flat panel displays like liquid crystal display ("LCD") and plasma display panel ("PDP") types can have a smaller dynamic range than the more traditional cathode ray tube ("CRT") designs. However, an efficient use of display dynamic range depending on the picture contents can increase picture contrast and quality. Such dynamic contrast improvement ("DCI") is disclosed in U.S. Pat. No. 6,285,413 B1 to Akbayir ("Akbayir"), which is incorporated herein by reference.

Akbayir teaches how to analyze a picture framewise and adjust the parameters of a dual segment transfer function depending on the analysis results for the best subjective picture quality. FIG. 1 is a graph of the dual segment transfer function disclosed in Akbayir. Each image frame is analyzed for four different characteristics: image average brightness, dark sample distribution, frame peak value, and signal to noise ratio. The transfer function consists of two segments (a lower segment for dark samples, and an upper segment for light samples) with an adaptive pivot point. Signal to noise ratio adapts the signal preparation (the noise estimator is not a part of DCI), whereas the image average brightness, dark sample distribution, and frame peak value control the transfer function. The gain of the lower segment is adaptive to the dark sample distribution. A higher gain results from fewer dark samples and a lower gain from a higher number of dark samples. The gain of the lower segment is limited to following the range:

$$1.0 \leq Segment1\_Gain \leq Max\_Gain1$$

The gain of the upper segment of the transfer function is adaptive to the frame peak value. It is computed such that a detected peak value lower than a nominal will be moved to the nominal peak value. If the detected peak value is equal to or higher than the nominal peak value then a gain of 1.0 is used (no change). The computed theoretical gain is limited then to a maximum value in order to avoid unnatural effects:

$$1.0 \leq Segment2\_Gain \leq Max\_Gain2$$

The third parameter of the transfer function is the pivot point. It is adaptive to the average image brightness and allows dark pictures to be made more contrasting and light. Low average brightness moves the pivot point to a lower level and high average brightness moves the pivot point to a higher level. The minimum pivot point value is about 7 IRE and the maximum about 40 IRE, where a 100 IRE (Institute of Radio Engineers units) luminance represents the white level of a standard video signal and a 0 IRE luminance represents the blanking level.

Akbayir teaches that the DCI transfer function is computed within the vertical blanking time (see Akbayir at column 8, lines 43–45). The vertical blanking time or vertical blanking interval ("VBI") is the time required for the electron beam in a video CRT to be moved from the end of a frame back to the top of the screen. In a software-based video processing system, the microprocessor may need to perform many operations during the VBI. For example, VBI portions of television signals ("VBI signals") can be used to transmit information other than traditional program video or audio, such as closed-caption text and stock market data. Performing DCI computations during the VBI reduces the amount of time that a microprocessor has to receive and process VBI signals and/or perform other operations during the VBI.

The present invention is directed to overcoming this problem.

SUMMARY OF THE INVENTION

A method for dynamic contrast improvement ("DCI") of video data includes the steps of analyzing a portion (200) of a video frame, and forcing a start of DCI transfer function computations in response to an end of the analysis of the portion (200) of the video frame.

DETAILED DESCRIPTION OF THE PREFERRED EMBODIMENT

The characteristics and advantages of the present invention will become more apparent from the following description, given by way of example.

Figure 1:
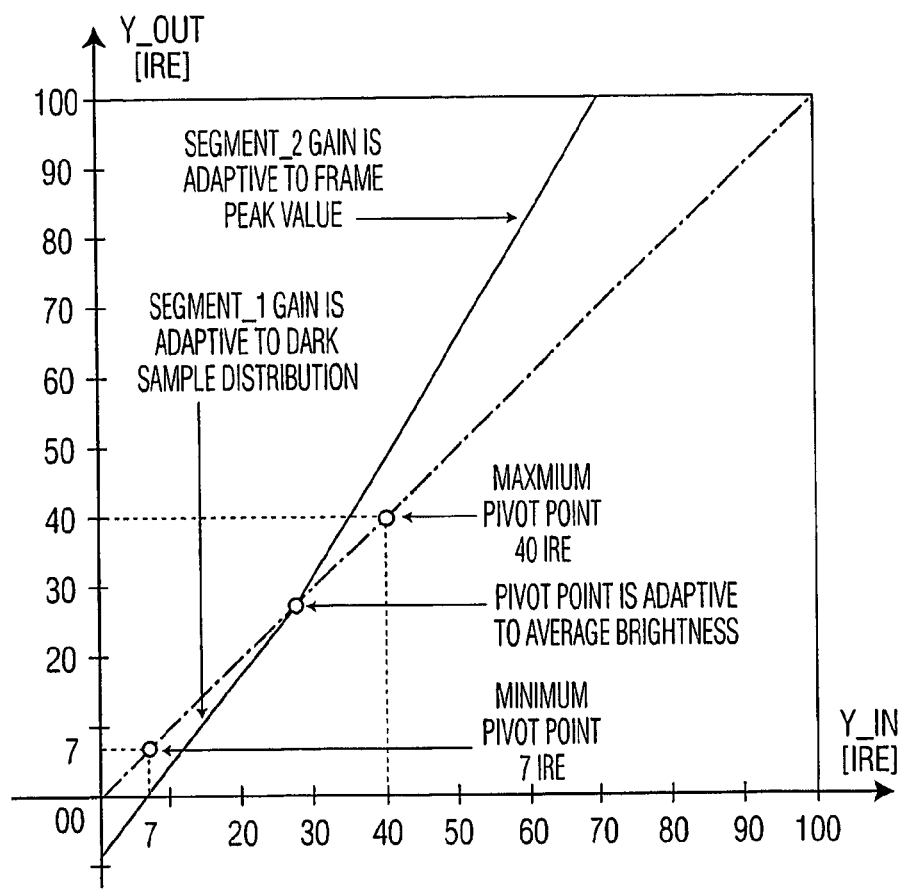
FIG. 1 is a graph of the dual segment transfer function disclosed in U.S. Pat. No. 6,285,413 B1 to Akbayir.
Figure 2:
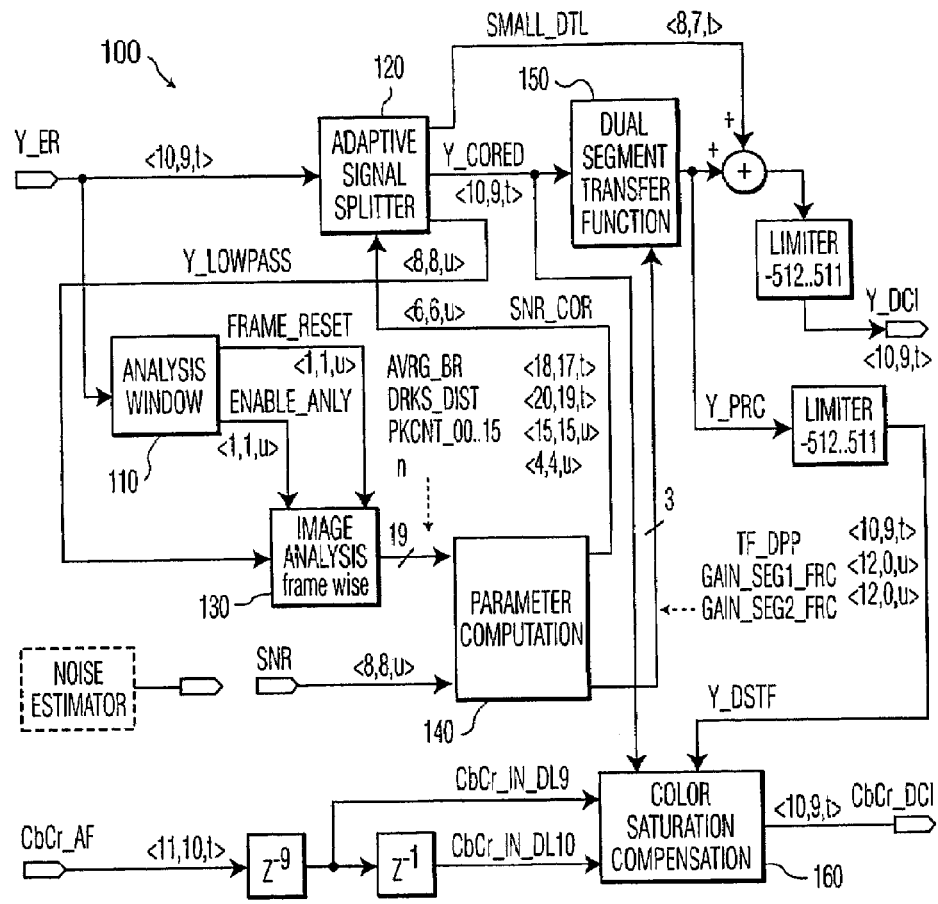
FIG. 2 is a top level functional block diagram of an exemplary method and apparatus for DCI according to the present invention.

FIG. 2 is a top level functional block diagram of an exemplary method and apparatus for DCI 100 according to the present invention. As shown in FIG. 2, DCI 100 includes 6 main blocks: an Analysis Window Block 110, an Adaptive Signal Splitter Block 120, an Image Analysis Block 130, a Common Infinite Impulse Response ("IIR") Filter and Parameter Computation Block 140, a Dual Segment Transfer Function Block 150, and a Color Saturation Compensation Block 160. Suitable implementations of Adaptive Signal Splitter Block 120, Dual Segment Transfer Function Block 150, and Color Saturation Compensation Block 160 are known from U.S. Pat. No. 6,285,413 B1 to Akbayir. The present invention includes a conventional microprocessor 250 (see FIG. 4) and suitable software that improves the functionality of Analysis Window Block 110, Image Analysis Block 130, and Parameter Computation Block 140 as discussed in further detail below. To this end, microprocessor 250 (see FIG. 4) is a shared resource that executes the software, which is described herein in terms of corresponding functional block diagrams and timing diagrams that should be readily understood by one of ordinary skill in the art. It also is noted, however, that the block/timing diagram approach is used herein merely for clarity of exposition, and it should be appreciated that one of ordinary skill in the art could alternatively describe the software in terms of corresponding flowcharts or in any other suitable manner.

Figure 3:
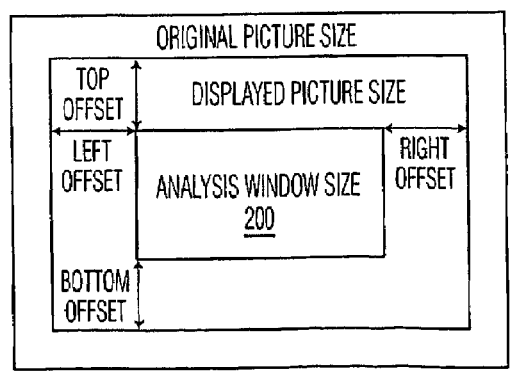
FIG. 3 is an illustration of an exemplary analysis window.

FIG. 3 is an illustration of an exemplary analysis window 200. It is known to change the picture format in applications like zoom and format conversion, where the whole picture size is not displayed. The analysis window 200 defines a portion of the displayed picture size for DCI analysis. The analysis for DCI functions is enabled within the window 200 and disabled outside the window 200. In this way it is also possible to disable the analysis in subtitles and logos. In the exemplary embodiment of the present invention, the microprocessor 250 (see FIG. 4) gets the user settings for analysis window 200 and the size of displayed picture after format control, calculates the size of analysis window 200 and writes the parameters for the window 200 as start line, end line, start pixel and end pixel to the registers SLINE, ELINE, SPIXEL, EPIXEL. Comparison of the line and pixel counters with the parameters for window 200 provides an enable signal for samples within the analysis window 200. The user settings for analysis window 200 are defined in term of offsets related to the displayed picture size. The following equations show relationships between the user settings and corresponding pixel and line numbers:

```
SPIXEL = LEFT_OFS
EPIXEL = PIXEL_PER_LINE - RIGHT_OFS - 1
SLINE = TOP_OFS
ELINE = LINE_PER_FIELD - BOTTOM_OFS - 1
LEFT_OFS    Number of pixels on the left picture side, omitted
            from analysis
RIGHT_OFS   Number of pixels on the right picture side, omitted
            from analysis
TOP_OFS     Number of lines on the top of picture, omitted from
            analysis
BOTTOM_OFS  Number of lines on the bottom of picture, omitted
            from analysis
```

Figure 4:
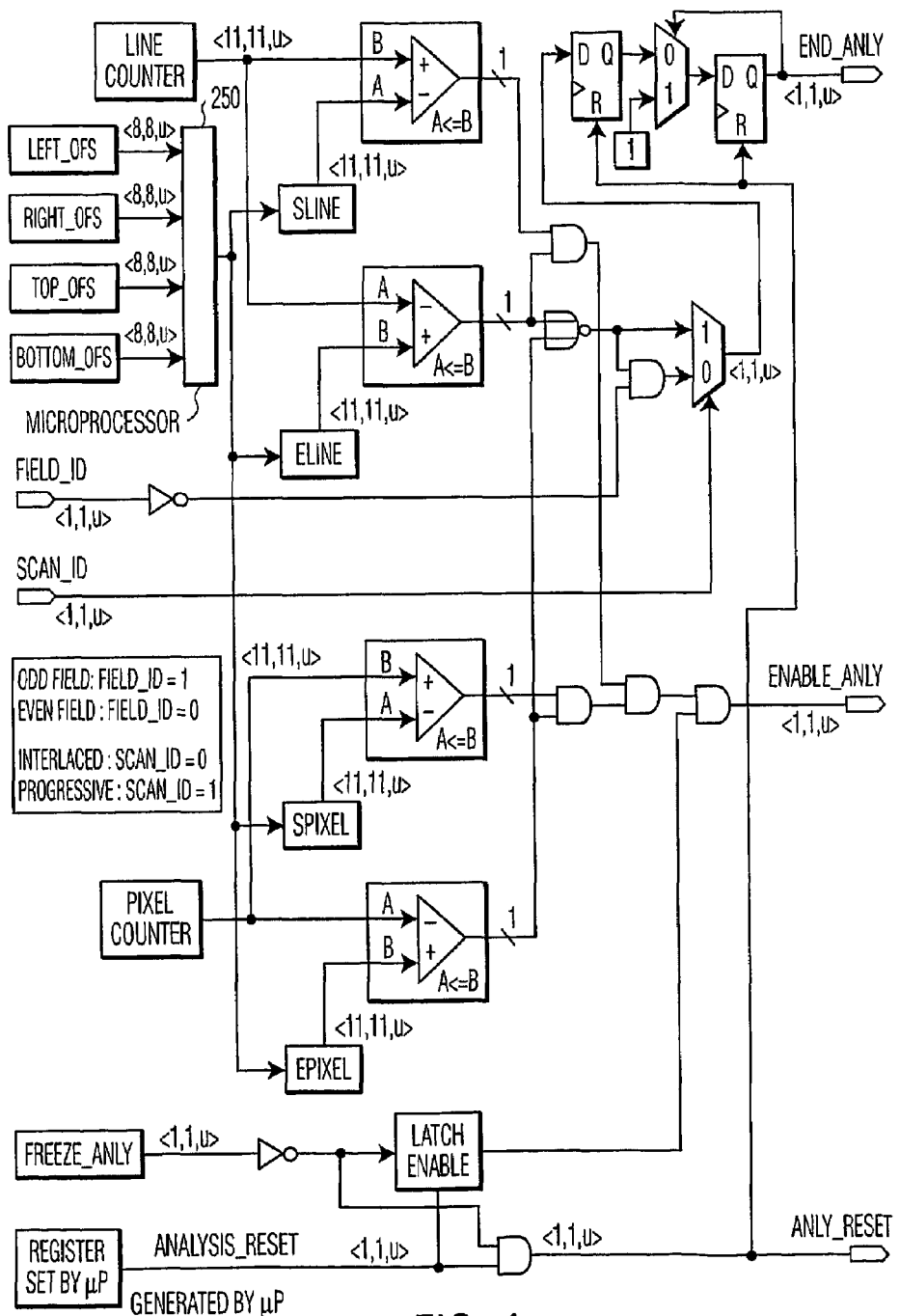
FIG. 4 is a functional block diagram of the exemplary Analysis Window Block of FIG. 2.
Figure 4A:
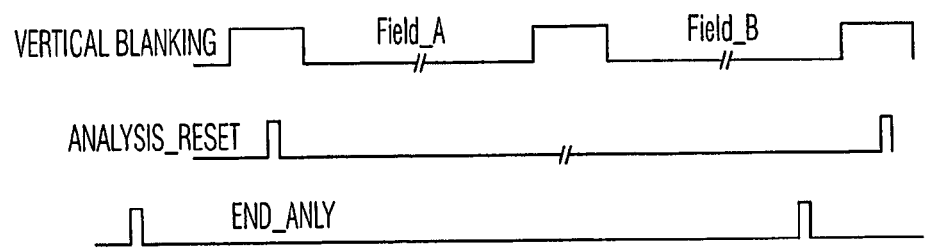
FIG. 4a and FIG. 4b are exemplary timing diagrams for the ANALYSIS_RESET and END_ANLY signals generated by the exemplary Analysis Window Block.
Figure 4B:
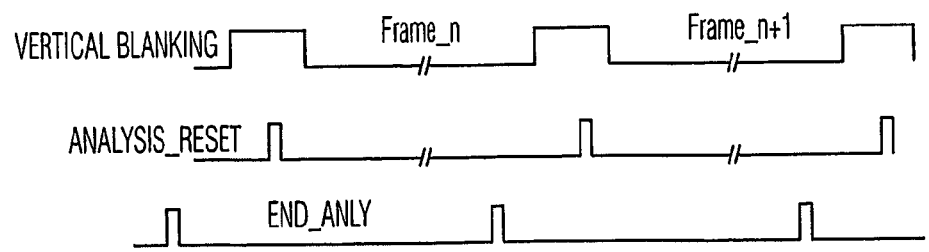

FIG. 4 is a functional block diagram of the exemplary Analysis Window Block 110 of FIG. 2, and FIG. 4a and FIG. 4b are exemplary timing diagrams for the ANALYSIS_RESET and END_ANLY signals generated by the exemplary Analysis Window Block 110. The present invention updates the software registers used in performing DCI calculations every frame without using up the vertical blanking interval. This allows microprocessor 250 to use the vertical blanking interval to perform other necessary system calculations. This also allows a less complex implementation of microprocessor 250 to be used in a video signal processing system that provides DCI. To allow microprocessor 250 more time to perform the other calculations, the present invention forces updating of the DCI registers to occur between the signal END_ANLY and the vertical blanking interval. The signal END_ANLY is used to interrupt microprocessor 250 using a conventional interrupt input. The DCI calculations are performed until the beginning of the vertical blanking interval, or shortly thereafter. It is expected that the DCI calculations will be completed at this time. However, there is nothing to force the calculations to terminate until ANALYSIS_RESET is activated. At activation of ANALYSIS_RESET the new DCI data must be written into the DCI registers. By forcing the DCI calculations to occur in this manner microprocessor 250 has most, if not all of the vertical blanking interval to perform other calculations and control. Since END_ANLY is activated every frame at the end of the analysis window 200, the DCI registers are updated every frame.

The register FREEZE_ANLY is included for test purposes. It allows a frame synchronous freeze of the image analysis so that the analysis of the currently processed frame is always completed and then the analysis is disabled. This is controlled by the ANALYSIS_RESET signal. The ANALYSIS_RESET signal is generated by microprocessor 250. It is activated (set to high) for a short time (a few clock-periods) after reading the analysis results and then set again to low. There is no fixed time point for the ANALYSIS_RESET signal. However, ANALYSIS_RESET is activated within the proper range (i.e., frame based, within the vertical blanking time, after reading the analysis results) (see FIG. 4a and FIG. 4b). When the FREEZE_ANLY register is set to "on" then the analysis is frozen and the ANLY_RESET signal disabled (set to low). The latest analysis results are taken for further image processing as long as the register is "on".

Analysis Window Block 110 also provides the END_ANLY signal to indicate the end of the analysis. For a precision analysis, needed for the Dark Sample Distribution computations, it is necessary to check the remainder data in the register and correct the results. When END_ANLY signal is high then the needed operations can be performed in order to complete the dark sample distribution analysis.

Figure 5:
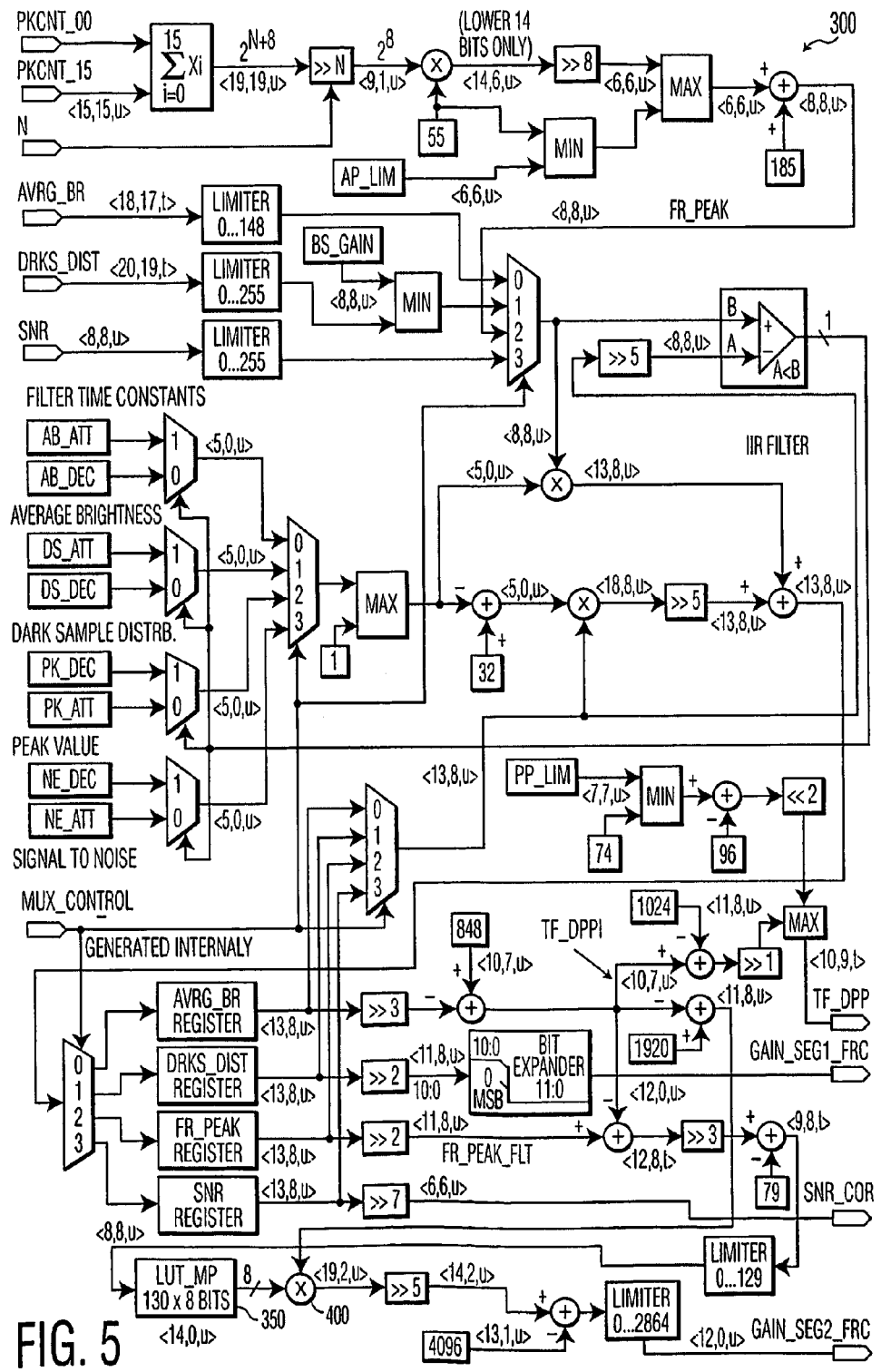
FIG. 5 is a functional block diagram of a look-up table implementation of exemplary Common IIR Filter and Parameter Computation Block.

FIG. 5 is a functional block diagram of a look-up table implementation 300 of exemplary Common IIR Filter and Parameter Computation Block 140. The image analysis is done framewise. Thus, for interlaced scanning, Image Analysis Block 130 (see FIG. 2) provides analysis results at the end of the second field (see, e.g., the END_ANLY signal in FIG. 4a). Actually, the analysis is only done inside analysis window 200 (see FIG. 3). If analysis window 200 is smaller than the active picture size, which is usually the case, then the analysis initially seems to be finished at the end of analysis window 200. The END_ANLY signal from Analysis Window Block 110 (see FIG. 4) indicates this.

Image Analysis Block 130 (see FIG. 2) provides information for each frame about the average brightness (AVRG_BR), dark sample distribution (DRKS_DIST), and frame peak value (FR_PEAK). These values determine the characteristics of the transfer function used for the next frame. All these three values are filtered with an IIR filter each frame. The time constants for the filtering are determined by the settings AB_ATT, AB_DEC for average brightness, DS_ATT, DS_DEC for dark sample distribution and PK_ATT, PK_DEC for peak value. Using two time constant settings for filtering of each analysis information allows independent control of the attack and decay time (xx_ATT: attack time constant; and xx_DEC: decay time constant).

The frame average brightness determines the pivot point of the Dual Segment Transfer Function. The value is limited to a suitable range and then filtered with an IIR filter. Depending on the current and previous value the decay or attack time constant is used for filtering. The filtered value is stored with a precision of 5 fraction bits in the frame average brightness register, AVRG_BR. First an internal pivot point value, TF_DPPI, is computed. It is needed in upper segment gain computation part. The value is in unsigned format and contains 3 fraction bits. The internal pivot point value has to be matched to the luma format. The final pivot point value is obtained by converting the internal value to signed format and truncating the least significant bit ("LSB"). The available dynamic range of the pivot point is reduced with user setting PP_LIM (if desired) by limiting the lower value.

The peak counter values from the frame peak analysis part are summed up and normalized by a factor of 2^N. If all counters PKCNT_00 ... PKCNT15 are completely filled up then the result is 255. Depending on the counter states, the normalized value is between 0 and 255. This value has a precision of 8 bits. The minimum peak value is limited to 185 (for 8-bit luminance signal in unsigned format) in order to limit the gain of the upper segment to a desired maximum value. The maximum peak value is 240. The gain of the upper segment is determined such that the detected peak value is stretched to 240 if it is lower then 240. The value of 55 comes from the difference between the maximum and minimum peak value. It is multiplied by the normalized peak value. With a shift operation of 8 bits the fraction bits are truncated. The result is frame peak value relative to the minimum value of 185. The minimum value is limited by user setting AP_LIM (if desired) so that the gain of the upper segment does not exceed a predefined maximum value. The maximum gain is defined to preserve natural picture quality, as follows:

$$1.0 \leq GAIN\_SEG2 \leq 1.699$$

The computed relative peak value is added to the minimum value in order to get the absolute frame peak value. After that the peak value is filtered with an IIR filter. Depending on the current and previous peak value decay or attack time constant is used for filtering. The filtered value is stored with a precision of 5 fraction bits in the frame peak register FR_PEAK. The upper segment gain is determined, as given in the following equation, by the filtered peak value and the pivot point position:

$$GAIN\_SEG2 = \frac{Y100IRE - TF\_DPPI}{FR\_PEAK\_FILT - TF\_DPPI}$$

where GAIN_SEG2 indicates: Segment-2 gain for dual segment transfer function; and where Y100IRE indicates: Luminance signal 100 IRE value For further computation a precision of 3 fraction bits is enough; therefore, two LSBs are truncated. The pivot point delivered from average brightness analysis (it has the same format and precision) is subtracted from peak value. This is the denominator of the equation determining the segment gain.

The computation of the segment gain includes a divider that is implemented with a look-up table 350 and a multiplier 400. The look-up table 350 contains the results of the computation $$\frac{1}{FR\_PEAK\_FILT - TF\_DPPI}$$

with a precision of n bits, as given in the table below:

TABLE 1

Look-Up Table

X = FR_PEAK_FILT − TF_DPPI
$X_{min}$ = FR_PEAK_FILT$_{min}$ − TF_DPPI$_{max}$
$X_{max}$ = FR_PEAK_FILT$_{max}$ − TF_DPPI$_{min}$
ROM_Address = X − $X_{min}$ ROM_Value = $\frac{2^n}{X}$   n: number of fraction bits for FR_PEAK_FILT$_{min}$ = 185   FR_PEAK_FILT$_{max}$ = 240
⇒  TF_DPPI$_{min}$ = 32   TF_DPPI$_{max}$ = 106

| X = (FR_PEAK_FILT − TF_DPPI) | ROM_Address = (X − Xmin) | ROM_Value = (2^n/X + 0.5), for n = 14 |
|---|---|---|
| 79 | 0 | 207 |
| 80 | 1 | 205 |
| 81 | 2 | 202 |
| . | . | . |
| . | . | . |
| . | . | . |
| 206 | 127 | 80 |
| 207 | 128 | 79 |
| 208 | 129 | 79 |

The transfer function for luminance signals higher than the pivot point is given by the equation:

$$Yout = gain\_seg2 * (Y_{in} - TF\_DPP) + TF\_DPP \quad Y_{in} > TF\_DPP$$

where Yout indicates: Output luminance signal; and
where Yin indicates: Input luminance signal The segment gain is split into integer and fraction parts, where the integer part is always 1:

$$GAIN\_SEG2 = GAIN\_SEG2\_INT + GAIN\_SEG2\_FRC = 1 + GAIN\_SEG2\_FRC$$

$$Y_{out} = GAIN\_SEG2\_FRC * (Y_{in} - TF\_DPP) + Y_{in} \quad Y_{in} > TF\_DPP$$

Using only the fraction part saves one bit. Therefore, the integer part is subtracted from the computed gain. The results are written into register GAIN_SEG2.

Since a look-up table does the 1/x approximation, the precisiori of this value is further reduced and freed from offset of 79 for using as Look-Up table address.

The numerator (Y100IRE−TF_DPPI) of the same equation is multiplied with the Look-Up table data and the fraction bits are truncated by a shift operation of 5 bits.

The frame dark sample distribution value determines the gain of the lower segment. It is also filtered in the same way as the other parameters and then converted to the desired format by truncating the 2 LSBs.

The signal to noise ratio, measured outside the DCI by an external device, is also processed in the same way so that it can be used to control the coring value in Adaptive Signal Splitter Block 120 in a known manner.

Figure 6:
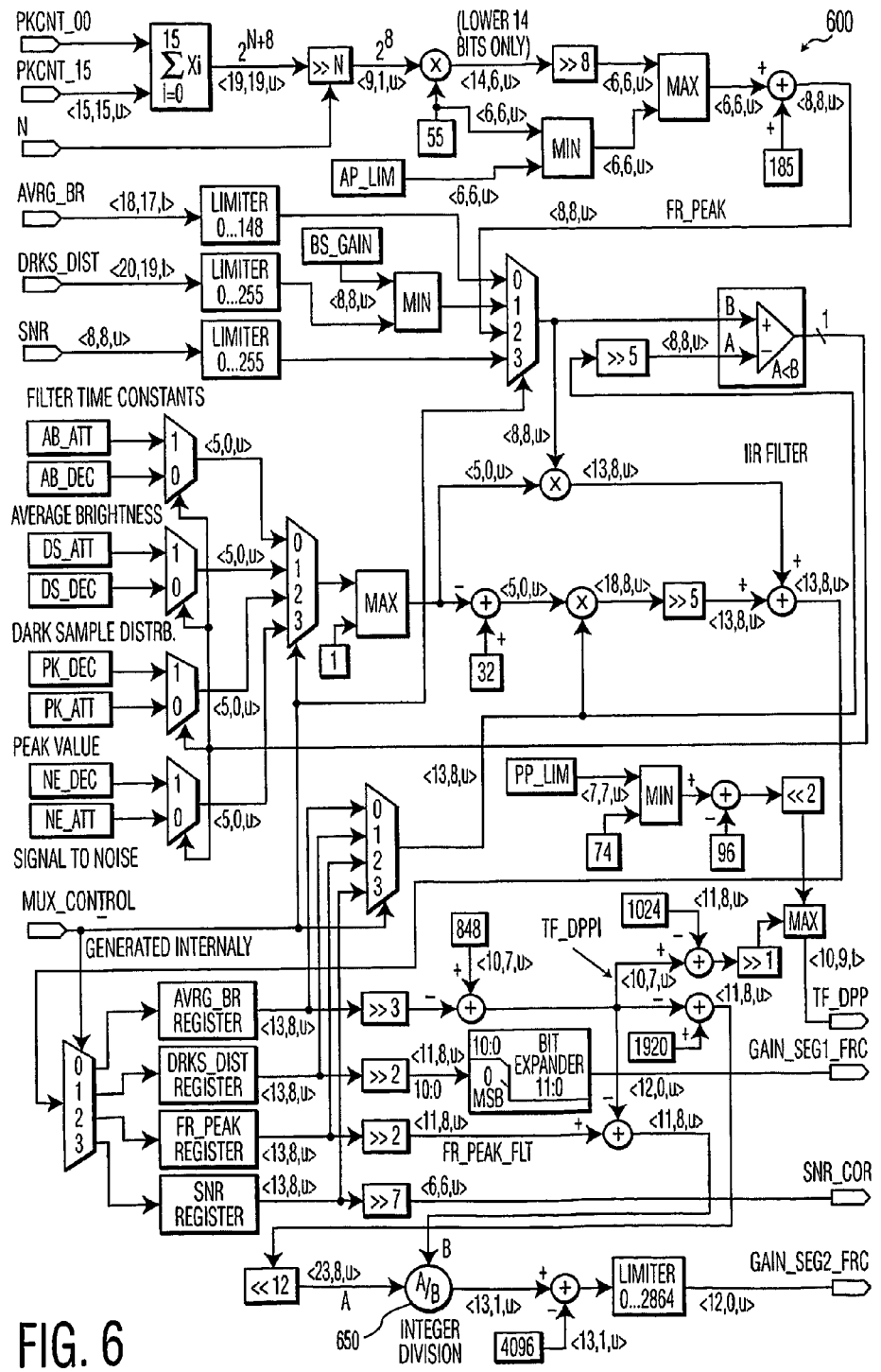
FIG. 6 is a functional block diagram of a divider implementation of exemplary Common IIR Filter and Parameter Computation Block 140.

FIG. 6 is a functional block diagram of a divider implementation 600 of exemplary Common IIR Filter and Parameter Computation Block 140. Divider implementation 600 performs the same operations as look-up table implementation 300 (see FIG. 5) except that the look-up table 350 and multiplier 400 (which approximate 1/x) are replaced by a suitable division block 650 (such as an integer division in the C programming language).

Thus, in operation (with either look-up table implementation 300 or divider implementation 600), DCI 100 generates the signal END_ANLY to indicate the end of the analysis and interrupts the microprocessor with END_ANLY to read the analysis data as soon as they are available. Depending on the size of analysis window 200, the analysis is finished much earlier than the start of the vertical blanking interval. Consequently, the microprocessor performs the DCI computations during the active video (rather than during the vertical blanking interval) and only needs to write the results into the segment registers of the Dual Segment Transfer Function during vertical blanking. Thereafter, the microprocessor is reliably freed up for other tasks during the vertical blanking time. Additionally, implementing the DCI algorithms of the present invention in software allows for future adjustments to the algorithms by mere reprogramming, as opposed to the more costly and complex steps that are typically required to reconfigure a hardware-based processing system.

The invention claimed is:

1. A method for dynamic contrast improvement of video data, comprising the steps of:
    analyzing a portion of a video frame;
    forcing a start of DCI transfer function computations in response to an end of the analysis of the portion of the video frame completing the DCI transfer function computations during a reception of said video frame.

2. The method of claim 1, wherein the forcing step includes providing an interrupt signal to a microprocessor.

3. The method of claim 2, further including the steps of:
    writing results of the DCI transfer function computations into registers during a vertical blanking interval that follows the reception of the video frame.

4. The method of claim 3, further including the steps of:
    maintaining a reset signal in a deactivated state after a reception of a first field of an interlaced video frame; and
    activating the reset signal after a reception of a second field of the interlaced video frame.

5. The method of claim 1, further including the steps of:
    writing results of the DCI transfer function computations into registers during a vertical blanking interval that follows the reception of the video frame.

6. A method for dynamic contrast improvement of video data, comprising the steps of:
    receiving data representing a video frame;
    analyzing at least a portion, defined by an analysis window, of the data representing the video frame for an image average brightness value and a dark sample distribution value;
    adjusting parameters of a dual segment transfer function based on the image average brightness value and the dark sample distribution value, the dual segment transfer function having a lower segment, an upper segment, and an adaptive pivot point which separates the lower segment and the upper segment;
    triggering a commencement of the adjusting step in response to a completion of the analyzing step, said completion of said analyzing step occurring during a reception of said video frame.

7. The method of claim 6, wherein the adjusting step includes moving the adaptive pivot point in response to the image average brightness value and adjusting a gain of the lower segment in response to the dark sample distribution value.

8. The method of claim 7, wherein the triggering step includes providing an interrupt signal to a microprocessor.

9. The method of claim 8, wherein the triggering step is completed prior to a completion of the receiving step.

10. The method of claim 6, wherein the triggering step includes providing an interrupt signal to a microprocessor.

11. The method of claim 10, wherein the triggering step is completed prior to a completion of the receiving step.

* * * * *